United States Patent [19]

Fort et al.

[11] 4,001,769

[45] Jan. 4, 1977

[54] DATA ARRAY NETWORK SYSTEM

[75] Inventors: J. Robert Fort; James A. Westphal, both of Altadena; Donald R. Juilfs, Chatsworth, all of Calif.

[73] Assignee: Geophysical Systems Corporation, Pasadena, Calif.

[22] Filed: Oct. 28, 1975

[21] Appl. No.: 626,139

Related U.S. Application Data

[63] Continuation-in-part of Ser. No. 563,184, March 28, 1975, Pat. No. 3,938,073, which is a continuation of Ser. No. 358,097, May 7, 1973, Pat. No. 3,881,166.

[52] U.S. Cl. .................... 340/15.5 TS; 340/172.5
[51] Int. Cl.² .................................................. G01V 1/34
[58] Field of Search ........... 445/1; 340/172.5, 155, 340/15.5 CD, 15.5 DA, 15.5 TS, 145 R, 147 SY; 346/33 C; 235/151.35; 178/58 R, 69.5 R; 179/15 AL

[56] References Cited

UNITED STATES PATENTS

| | | | |
|---|---|---|---|
| 2,906,996 | 9/1959 | Bachelet et al. | 340/155 |
| 3,237,164 | 2/1966 | Evans | 340/155 |
| 3,593,290 | 7/1971 | Kerr | 340/147 R |
| 3,651,474 | 3/1972 | Liberman | 340/172.5 |
| 3,652,979 | 3/1972 | Angelle | 340/15.5 MC |
| 3,723,971 | 3/1973 | Betts et al. | 179/15 AL |
| 3,748,638 | 7/1973 | Montgomery et al. | 340/172.5 |
| 3,786,419 | 1/1974 | Nick | 340/147 SY |
| 3,806,864 | 4/1974 | Broding et al. | 340/15.5 TS |
| 3,824,545 | 7/1974 | Brenner et al. | 340/147 R |
| 3,851,302 | 11/1974 | Schmitt | 340/15.5 TS |
| 3,873,961 | 3/1975 | Lee et al. | 340/15.5 TS |
| 3,881,166 | 4/1975 | Fort et al. | 340/15.5 TS |
| 3,882,465 | 5/1975 | Cook et al. | 340/147 R |
| 3,883,725 | 5/1975 | Fort et al. | 235/151.3 |
| 3,930,145 | 12/1975 | Fort et al. | 235/151.3 |
| 3,938,073 | 2/1976 | Fort et al. | 340/15.5 TS |

*Primary Examiner*—Gareth D. Shaw
*Assistant Examiner*—Jan E. Rhoads
*Attorney, Agent, or Firm*—Daniel Silverman

[57] ABSTRACT

A system for the field recording of seismic data in which a large plurality of geophones are arrayed on the earth and divided into groups, and each group is connected to an array terminal. All of the array terminals are connected in series, by cables, with the last terminal connected to a recording unit. In each of the terminals there are means to process the geophone analog signals by amplifying at constant gain and digitizing to 1 bit to provide a plurality of 1 bit pulses, which are stored in parallel in a parallel to serial convertor. On command from the recording unit, the bits stored in the convertors are read out in series and are transmitted by a pair of signal conductors to the next in series terminal for storage in the convertor, and from there to the convertor in the next in series terminal, and so on, until all of the bits stored in each of the terminals are transmitted as a plurality of short trains of single bit signals, to the recording unit, where they are recorded on a magnetic digital storage means. Each of the array terminals has an address register in which an address is stored, which is transmitted as a heading to the data stored in that convertor.

18 Claims, 1 Drawing Figure

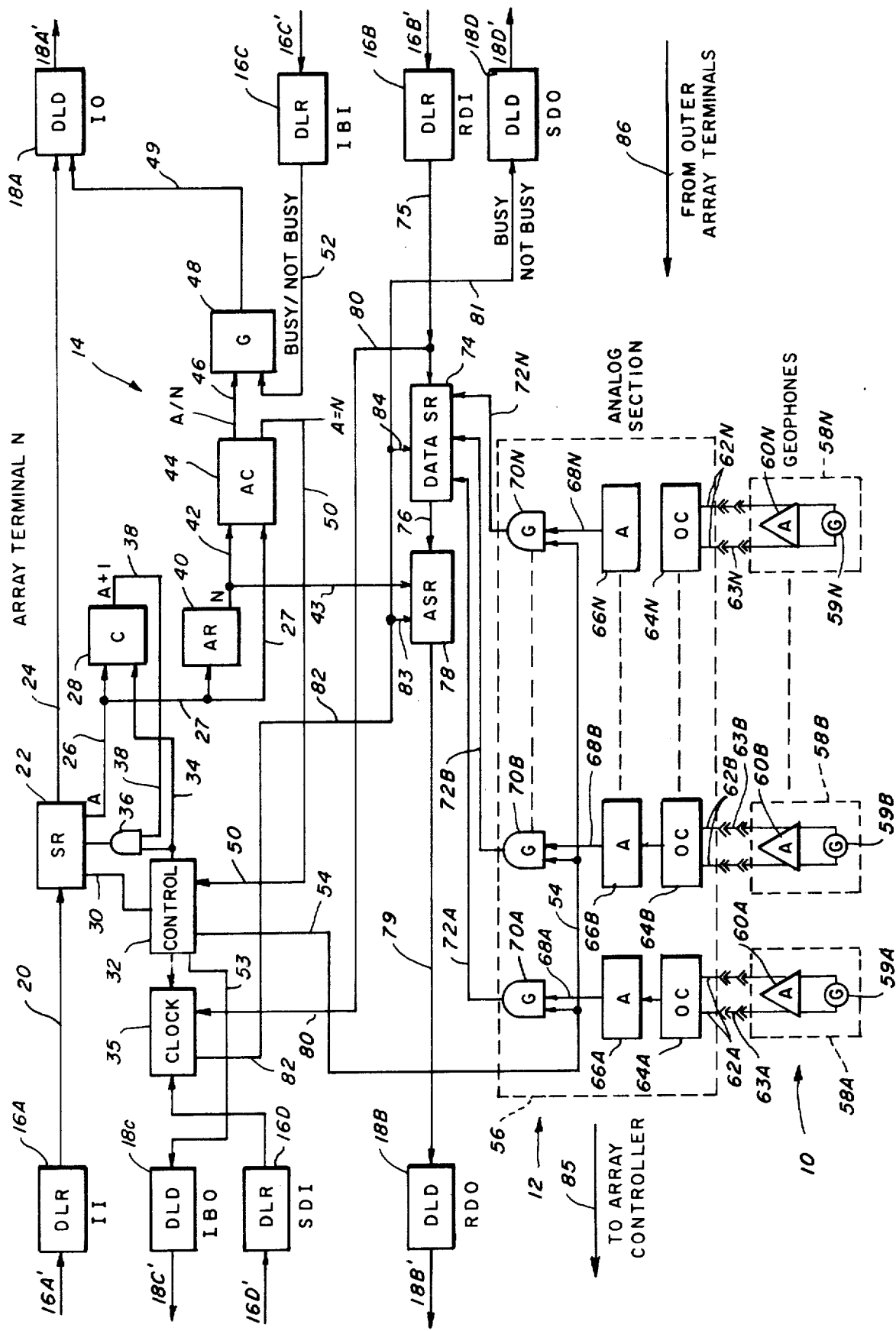

DATA ARRAY NETWORK SYSTEM

CROSS-REFERENCE TO RELATED APPLICATIONS

This application is a continuation-in-part of copending application Ser. No. 563,184 filed Mar. 28, 1975, now U.S. Pat. No. 3,938,073, issued on Aug. 22, 1975, which is a continuation of application Ser. No. 358,097, filed May 7, 1973, now U.S. Pat. No. 3,881,166, dated Apr. 29, 1975, entitled DATA ARRAY NETWORK SYSTEM. U.S. Pat. No. 3,881,166 is entered into this application by reference.

This application is related to two other copending applications assigned to the same assignee as this application. The titles of the other two applications are as follows: Ser. No. 358,077 filed May 7, 1973, DATA ACQUISITION AND STORAGE SYSTEM; Ser. No. 358,076 filed May 7, 1973, DATA COMPOSITING AND ARRAY CONTROL SYSTEM, now U.S. Pat. No. 3,930,145, dated Dec. 30, 1975. Application Nos. 358,076 and 358,077 are incorporated by reference into this application.

BACKGROUND OF THE INVENTION

This invention is in the field of data acquisition systems. More particularly, it is in the field of data gathering systems which involve a high plurality of separate detectors and channels, the signals from which are carried to the data storage means by a single pair of conductors.

While this invention is useful in the acquisition of any type of analog signals such as in the field of data collection, vibration analysis, sonar signaling, nuclear technology, and so on, it is most appropriately useful in the area of seismic prospecting and as a matter of convenience will be discussed in that application. This description in terms of a seismic system does not limit in any way the scope of this application and its use in other fields of data acquisition.

In the prior art, seismic operations have been carried out with field instrumentation systems which have, in general, been limited by size, weight and power requirements to 24–48 separate recording channels. Additional recording channels have been provided by the process of adding additional recording truck units, and so on. Although there have been suggestions in the technical press for multiplex recording systems whereby high pluralities of recording channels can be provided using a single conductor pair for the transmission of the separate traces there have been no practical ways shown for carrying out such suggestions. Furthermore, those that have been suggested call for control and processing devices in series with each signal channel at considerable complexity and cost.

SUMMARY OF THE INVENTION

It is a primary object of this invention to provide a system of data acquisition, and to provide a network of terminals for the acquisition, processing, and transmission of a large plurality of independent analog signals derived from a corresponding plurality of detectors spaced in a selected array on the surface of the earth.

It is a further object of this invention to provide means by which this large number of independent channels can be broken up into a plurality of groups which are connected into a plurality of terminals, and to provide means by which the sequence of data signals transmitted to the recording unit can be identified in terms of a specific array terminal and specific channels in that terminal.

These and other objects are realized and the limitations of the prior art are overcome in this invention, which permits the operation of recording units in the field with a large number (such as 250 to 1,000) of separate recording channels, all of which are multiplexed onto a single pair of conductors. This is accomplished by having a plurality of array terminals. These are data amplification, digitization, storage and transmission units which are designed to handle a selected number of recording traces, such as 16, for example.

Each array terminal has a housing out of which are provided multiple means to connect to each of the geophones, such as 16 separate conductor pairs, of selected length, each connected to at least one geophone, so that the geophones can be arrayed in a selected spacial pattern on the earth.

There may be a large plurality of array terminals, all essentially identical in construction. These can be placed in any geometrical pattern on the earth and interconnected by substantially identical multiple-conductor cable units. Each of the cable units includes signal and control conductors. Each of the array terminals has one input and one output port, so that all array terminals are connected in series operative connection.

The manner in which the seismic signals produced by the geophones are multiplexed and transmitted to the truck is described in said copending application Ser. No. 358,077.

Assume that the array terminals (AT) are numbered serially from 1-M away from the recording truck. Each array terminal, say number N, receives an interrogation from the truck, answers it, then repeats the interrogation through to the next terminal N + 1 which answers it and passes it onto the next on N + 2, and so on. Similarly, the answers from succeeding series-connected terminals are received and repeated back to the truck, N + 2 to N + 1 to N to N − 1, and so on. The data signals, which are short duration square wave pulses, or bits, are reconstructed and pulse shaped at each re-transmission from each terminal, into new square waves. Therefore, since the transmission between separate array terminals and between the first array terminal and the truck are relatively short cable lengths, of the order of 1,000 feet or less, these signals can be transmitted on conventional cable conductors. Therefore, the complexity of handling plugs and connections to coaxial cables, as previously suggested in the art, is not necessary in practicing this invention.

BRIEF DESCRIPTION OF THE DRAWINGS

These and other objects of this invention and a better understanding of the principles and details of the invention will be evident from the following description taken in conjunction with the appended drawing, which is a schematic diagram of the array terminal, and indicates the geophones, the analog portion of the signal handling circuits, the digital data circuits and the command circuits.

DESCRIPTION OF THE PREFERRED EMBODIMENT

This data array network system is ideally suited for gathering time domain information from a plurality of distributed locations, processing them into the form of digitized signals of one bit, that can be multiplexed from the entire plurality of separate channels onto a two conductor cable into the storage device. While this type of system can be used for any type of analog signals, it is ideally suited for a seismic geophysical system, and will, for convenience, be described in terms of such a system. However, the description of this invention in terms of a seismic system is purely coincidental and there are no limitations implied to the use of this system by its description in this manner.

The figure will be described in terms of three principal parts, a first part indicated by the numeral 10 which is the geophone portion, or the data gathering portion, each of the elements of which are outlined in dashed lines, numbered 58A, 58B . . . 58N.

A second portion of the array terminal network is indicated generally by the numeral 12 and is bounded by the dashed outline 56. This portion includes the analog signal apparatus.

The remaining portion of the diagram is devoted to the digital storage and transmission, and the command system, etc. and is indicated generally by the numeral 14.

The geophone terminals are indicated generally by the numerals 58A, 58B . . . 58N. Each of these geophone terminals includes a geophone 59A, 59B . . . 59N. The geophones are the sources of analog signals generated by the motion of the geophones in response to the arrival of an elastic wave in the earth, at the point of positioning of the geophones. This is fully described in said application Ser. No. 358,077. The geophones are connected into preamplifiers 60A, 60B . . . 60N. The purpose of the preamplifiers is to convert the voltage signal of the geophone into a current signal for impressing upon the cable, which are low impedance circuits. The cables, indicated by the numbers 63A, 63B . . . 63N, are connected between the outputs of the preamplifiers and the inputs 62A, 62B . . . 62N to the analog section of the array terminal, 56.

The inputs to the analog section, 62A, 62B . . . 62N are connected into optical couplers numbered 64A, 64B . . . 64N. The optical couplers comprise light emitting diodes (L.E.D) which are controlled by the analog current received from the cable. The light emitted by the LED's impinges on a photo sensitive transistor, which controls the amount of current flowing through the transistor and therefore converts the light, which was proportional to the current in the cable, into a voltage which is proportional to the light emitted by the LEDs.

The analog voltage outputs of the transistors in the optical couplers connect to high gain amplifiers 66A, 66B . . . 66N, for the purpose of amplifying the analog signal and converting it into a square wave signal, which is sent by conductor 68A, 68B . . . 68N to individual logic AND gates 70A, 70B . . . 70N. The gates connect through leads 72A, 72B . . . 72N to the parallel inputs of a parallel to serial convertor 74, also called a data storage register or data shift register. The second inputs to the gates 70 are connected to a line 54 which originates in a control 32. When a momentary positive pulse is placed on the line 54 the gates 70 are enabled, and simultaneously each of the outputs of the amplifier are connected to the data shift register. A logical 1 or a logical 0 are stored in the shift register, depending upon whether the square waves on the lines 68 are positive or negative at the moment the gates 70 are enabled. If the lines are positive, a logical 1 appears. If the square wave is in the negative phase, a logical 0 is impressed on the shift register. By this means, the analog signals are sampled, and the sample then, by its sign, enters the proper digital values into the converter 74.

There are a plurality of control conductors which go from the input of the array terminal to the next preceding array terminal, and a corresponding plurality of control conductors that go from the output of the array terminal to the next succeeding terminal. As shown in the drawing there is an arrow 85 indicating the direction to the preceding array terminals and the array controller, that is, to the left in the drawing. Corresponding arrow 86 labeled "from outer array terminals" indicates that the succeeding, or more distant array terminals are on the right side of the array terminal pictured. There are also a single pair of data conductors which are connected directly between the array terminals so that data from each of the array terminals can be sent on these two conductors through the intermediate array terminals to the array controller.

Inside of the array terminal all of the circuits are voltage controlled circuits. On the lines connecting the array terminals, it is desired that the lines be at low impedance to minimize the pickup of noise in these lines. Thus, coupling devices, called differential line drivers (DLD), or differential line receives (DLR), which convert for outgoing signals, the voltage on their input to current on their output, and vice versa, for incoming signals, they convert the incoming current signals to voltage signals for use inside of the array terminal. The DLD's and DLR's are commercial devices which are essentially amplifiers similar to those labeled 60 which couple the voltage output of the geophones to the cable, which goes to the array terminal. No further description is needed. The differential line receivers are numbered 16A, 16B, 16C, 16D, etc. and the differential line drivers are numbered 18A, 18B, 18C, 18D, etc.

Differential line receiver (DLR) 16A receives from the array controller, in accordance with the input arrow, interrogation commands, and passes this on by means of line 20 to a shift register 22 and out by line 24 to the DLD 18A. The interrogation command on 16A includes the digital address, A, of the array terminal for which the command is intended, and from which a response is expected. The address A (as a series of pulses) passes from the shift register 22 as a digital word representing the address of the array terminal being called, by line 26 to a counter 28, which adds one count to the value of the address received, and outputs an address number $(A + 1)$ which is one more than the address received. This goes by line 38, and gate 36 to the shift register, which puts out that new address $(A + 1)$ on the line 24, and through the DLD 18A to the next array terminal.

The same address that is received at 22 goes by line 26 and line 27 to an address comparator 44. One input of the address comparator 44 is stored in the address register 40 and is labeled N, being the address of this array terminal. This is unloaded from the address register and goes by line 42 into the address comparator 44, at the same time that the address received, A, goes by line 27 into the address compartor. If these two addresses are not equal, that is, if A is not equal to N, there is a signal on line 46 which goes to gate 48 and by line 49, to the DLD 18A and is passed on to the next array terminal. In other words, if the address A does not agree with the address N of the array terminal, the interrogation command is automatically passed on to the next array terminal.

On the other hand, if the address A is the same as N, then a signal is passed on by way of line 50 into the control 32. This provides the signal to digitize the analog signals and store the digitized values in the data shift register 74. This signal goes by line 54 to momentarily open the gates 70, and loads digital bits into the shift register 74, corresponding to the instantaneous sign of the analog signals at the time the gates 70 are open. Also there is a signal that passes by line 43 from the address register 40, to load the address N in an address shift register 78, which is in series, in advance of the DSR 74.

Therefore, on the reception of the command at the shift register 22 several things happen. If the incoming address A is not equal to the address N of the station, it is automatically passed on to the next array terminal. If the address A of the interrogation equals the address N of the station then the command address is incremented by 1 and pased on, and then the signal to the control on line 50 tells it to proceed with the digitization and loading of the data shift register 74, and the address shift register 76. The control 32 then tells the clock 35 to provide clock signals on 82 to shift out from the address register, and from the data shift register 74 the address N and the data, through the line 79 to the DLD 18B and on to the next preceding array terminal, and eventually to the array controller.

This is the procedure by which the data from the geophones at the array terminal N are digitized to one bit, and transmitted to the next array terminal. Once this has been done then the command which was passed onto array terminal (N + 1) in that array terminal, which is off to the right of this terminal N, the data from the geophones connected to that array terminal will be digitized, and will be inserted into the data shift register and the address word placed into the address shift register. They will then be shifted out of the registers in accordance with the clock of that array terminal, and will be delivered to the DLR 16B, which is the response data input, from an outer array terminal N + 1. This goes directly through lines 75 to the shift register 74 and data register 78 which are now empty, the data therein having been sent out previously. However, the incoming address word and data word cannot be shifted into the registers 78 and 74 until clock pulses are available.

As the data come in on line 75, they also go by line 80 into the clock 35. The clock 35 regenerates the clock pulses from the data, and with those pulses, shifts the incoming data into the registers 74 and 78. The clock 35 has its own clock rate which is used as the rate for shifting the address and data out of the registers 74 and 78. At the next preceding array terminal N − 1, the clock in that terminal will again regenerate the clock rate so that the data it receives can be shifted into the registers in that terminal, and so on.

Assuming that the address received, A, is that of the array terminal N, and data are being digitized and loaded into the registers prepartory to being transmitted out by the line 79 and DLD 18B. During this time, the terminal N is busy preparing and transmitting its own data. Consequently, the incoming line from AT (N + 1) through DLR 16B is not available. Consequently, there must be a signal prepared and sent to the next succeeding terminal, N + 1, that is preparing to send data in to terminal N, that the terminal N is busy, and to withhold transmission until a clear signal is delivered. The way that this is done is that when the clock 35 is outputting the shift pulses on line 82 to the shift registers 74 and 78, the same pulses go by line 81 to the DLD 18D. This provides a signal which says, "we are busy." The station terminal N + 1 will correspondingly withhold transmission when the busy signal is provided, and when the busy signal is not present, it will proceed to transmit to the DLR 16B, and into array terminal N.

DLR 16C is labeled interrogation busy input. When a signal comes to this input from N + 1 it says "don't send any more interrogation, we're busy." This puts a blocking signal on the gate 48, which prevents the transmission of any further commands which would have gone through line 46, line 49 and DLD 18A into the next terminal N + 1.

While this AT N is digitizing its analog signals preparatory to transmitting them to AT (N − 1), array terminal (N − 1) having received its command before AT N, has been busy sending its data on to AT (N − 2), and while it is transmitting its data, it sends out its busy signal on its DLD 18D. This busy signal arrives at AT N on DLR 16D. This line goes to the clock 35. So if DLR 16D says "we're busy", the clock 35 signal on 82 is disabled. Thus the transmission of the data from AT N is held up until that sent by AT (N − 1) is cleared to the next AT (N − 2). Now AT (N − 1) is ready to receive. The clock pulses are enabled, and the registers 78, 74 are shifted out, and transmitted to AT (N − 1) and to the array controller and to storage.

By the procedure described, all that the array controller needs to do is command the first array terminal AT1. This AT1 passes on the same command to AT2, while it proceeds to respond to the command. AT2 passes on the command to AT3 and proceeds to respond to the command. But AT2 can't transmit to AT1 until AT1 is clear, and AT3 can't respond until AT2 is clear, and so on. So the array terminals, by their internal logic do the work of signaling and timing all of the terminals. Thus a continuous stream of short trains of address and data are received at the array terminal in sequence from AT1 to ATM.

This application describes the invention which relates to the array terminal circuitry and includes everything from the point at which the geophone cables enter the terminal, to the command and data inputs and outputs. There are two main ports. One outward to succeeding terminal N + 1, and the other preceding outward to array terminal N − 1. The DLR's and the DLD's are the boundary of the circuitry of the terminals, and the connecting cables between terminals are connected to the DLD's and DLR's.

The details of the circuitry in portions 10 and 12 of the drawing are fully described in our companion copending application Ser. No. 358,077 which is made part of this application by reference. All of the apparatus such as the shift registers, counters, address comparators, gates, DLD's and DLR's etc. are standard pieces of integrated circuit logic, which are available on the market, and need not be described in detail. Consequently, further detail of this diagram and of the operation of the data array network system is not necessary.

Also the array controller which is a part of the overall system from which data commands and interrogations are received and to which data signals and responses are sent is fully described and claimed in another companion copending application Ser. No. 358,076, which is inserted into this application by reference.

Very little has been said about the data processing of the input channels, shown at the bottom of the figure. This processing can be of any desired type so long as the input analog signals are converted to digital signals that can be stored in the data register 74. However, this system of array terminals is ideally suited to a processing system in which the analog signals are amplified, and digitized to 1 bit to provide a train of digital bits for storage in the parallel-to-serial convertors. This is fully described in copending application Ser. No. 358,077.

Also, very little has been said about the cable systems which can be used with the array terminals of this invention. Reference is made to FIG. 1 of U.S. Pat. No. 3,881,166, which is entered by reference into this application, for one type of cable system which is fully applicable. Other cable connections are also possible, so long as the array terminals in any one cable array are connected in series. Means are provided in the array controller for handling a plurality of cable arrays, whereby, in each array the terminals are connected in series.

While we have shown the geophone conductors as separate two conductor cables, it is well known to cable these separate conductors into a multi-conductor cable. Also, the data conductors can be a twisted conductor pair, or other type of conductors, separate from, or incorporated in the multi-conductor cable.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of of equivalency to which each element or step thereof is entitled.

We claim:
1. A data gathering system comprising:
   a. a plurality of array terminals, each having a parallel to serial convertor means;
   b. each array terminal having a plurality of conductor means, each connected to at least one detector so that said detectors can be positioned in selected spaced relation, to sense at least one physical parameter, and to produce an analog signal indicative of said parameter;
   c. each array terminal having an input port and an output port, into each of which a multiple conductor cable is connected, said multiple conductors comprising signal and control conductors;
   d. means, including a plurality of selected lengths of said cable, to connect said array terminals in series connection, and to connect the last series of said terminals to array controller means, said signal conductors connecting said parallel to serial convertor means in adjacent terminals;
   e. means, in said array controller means, to signal said terminals, by a coded signal on said control conductors;
   f. a plurality of means in each array terminal, each one in circuit with one of said detector means to amplify, digitize to 1 bit said analog signal, and to store said digitized signals in said parallel to serial convertor means;
   g. means, on command from said array controller means, to read out and transmit said 1 bit digitized signals, stored in said convertor means, to the convertor means in the next in series array terminal, whereby said digitized signals are transmitted sequentially through each of said convertor means to said array controller means.

2. A data acquisition system comprising:
   a. a plurality of N spaced apart array terminals, and means for collecting a plurality of M analog signals into each of said terminals;
   b. means, in each of said terminals, for converting said analog signals to digital signals and storing same in parallel to serial convertor means;
   c. means to connect said parallel to serial convertor means in each of said terminals in series operative connection and to a data storage means in an array controller means; and
   d. means, on command from said array controller to each of said array terminals, to sequentially transmit the stored digital data in each of said parallel to serial convertor means to and through each of the parallel to serial convertor means in each of the array terminals in series and to said array controller.

3. The system as in claim 2 in which said digital signal are 1 bit signals.

4. The system as in claim 3 including clock means to regenerate the clock timing from the incoming data from the next succeeding array terminal, to read said data into said convertor means, and to provide clock pulses to read data out of said convertor means and into the preceding in series array terminal.

5. A data acquisition system comprising:
   a. at least three spaced apart array terminals, A, B, C where commands from an array controller are sent to A, then to B, then to C, and means for collecting at least one analog signal into each of said terminals;
   b. means, in each of said terminals, for converting said analog signals to digital signals and storing same in a parallel to serial convertor means in said terminals;
   c. first conductor means to connect said register means in said terminal B to register means in the preceding in series terminal A, and second conductor means to connect said register means in said terminal B to the succeeding in series terminal C;
   d. clock means in each of said terminals, and means to transmit, on said first conductor means, data stored in said register means to the preceding in series terminal A, at the rate of said clock means in B; and
   e. means to receive in B, data from the succeeding in series terminal C, means to determine the clock rate of said received data, and means to read said received date into said register means in B at the clock rate of said received data.

6. The system as in claim 5 including means in said preceding in series terminal A to receive said digital signals transmitted from said terminal B, means to determine the clock rate of said received digital signals, and means to store said digital signals in register means in said terminal A at the clock rate of said received digital signals.

7. The system as in claim 5 in which said digital signals are single bit signals 8. The system as in claim 5 in which said means to convert comprises:
   a. means to amplify said analog signals at constant gain and convert to square waves signals;
   b. means to transmit said square wave signals to said parallel to serial convertor means through gate means; and
   c. means to momentarily open said gate means at selected times.

9. In a digital data acquisition system in which at least one analog signal is received in each of a plurality of signal terminals, clock means in each of terminals; means in each of said terminals to convert said analog signals to digital signals and for storing said signals; the improvement comprising:
   a. multiple conductor means connecting said terminals in series and to a data storage and control means;
   b. said multiple conductor means including:
      1. at least two first conductors for digital data signal transmission; and
      2. at least two second conductors for transmission of command signals from an array controller;
   c. means in each terminal to transmit digital data signals over said first conductors in a first direction, to the preceding in series terminal; and
   d. means in each terminal to transmit command signals over said second conductors in a second reverse direction from each terminal to the succeeding in series terminal.

10. The system as in claim 9 including means in each terminal on receipt of a command signal from said array controller to compare the address in said command signal with the address of said terminal, and including means to transmit said command to the next array terminal if said addresses are not the same.

11. The system as in claim 9 including means in each terminal, on receipt of a command signal from said array controller, to compare the address in said command signal with the address of said terminal, and including means to transmit said command signal with its address incremented by one to the next array terminal, if said addresses are the same.

12. The system as in claim 9 including means in each terminal, on receipt of a command signal from said control means to compare the address in said command signal with the address of said terminal, and if said addresses are the same, including means to initiate the transmission of the data stored in said parallel to serial convertor to the preceding in series terminal.

13. The system as in claim 9 including in each terminal address register means for holding a digital signal representing the address of said terminal, and including second register means in series with a parallel to serial convertor means, and means for loading the address from said address register to said address serial register, and on command to transmit said digital data signals, whereby said address forms a header for said digital data signals.

14. The system as in claim 9 including means in each terminal to transmit to the succeeding in series terminal a busy signal whenever said data register means contains data.

15. In a data acquisition system comprising at least two array terminals (AT), each receiving a plurality of analog signals, means in each array terminal to
   amplify at constant gain said analog signals,
   digitize said amplified analog signals to 1 bit,
   store said 1 bit digitized signals, in parallel, in parallel to serial convertor means,
   clock means, and
   means to determine clock rate from a train of digital 1 bit signals;
   first conductor means to connect the convertor means in each AT to the convertor means in the adjacent terminals;
   the method of acquisition and transport of said 1 bit signals, comprising:
   a. on receipt of a selected command, addressed to a selected array terminal, amplifying, digitizing to 1 bit, and storing said analog signals in said parallel to serial convertor means;
   b. transmitting, as a first serial train of 1 bit signals to the preceding in series array terminal over said first conductor means, at the clock rate of said clock means, the 1 bit signals stored in said convertor means;
   c. receiving, from the succeeding in series AT over said first conductor means, a second train of 1 bit digital signals;
   d. determining the clock rate of said second train of 1 bit digital signals; and
   e. shifting said second train of 1 bit signals into said convertor means at the clock rate determined from said second train.

16. The method as in claim 15 including the additional steps between steps (a) and (b) of;
   entering into an address register in series with said convertor means the address of said array terminal;
   whereby in step (b) when said first train of 1 bit signals is shifted out of said convertor means, it will be shifted through said address register; and said address stored in said address register will be transmitted to the next array terminal as a header to said train of 1 bit signals.

17. The method as in claim 15 including the additional steps comprising, on receipt of said commands;
   comparing the address of said command to the address of said terminal and incrementing the address by one count and transmitting the incremented address to the next array terminal if said address are the same.

18. The method as in claim 15 including the additional steps comprising:
   comparing the address of said command to the address of said terminal, and transmitting said address and command without change to the next array terminal if the addresses are not the same.

* * * * *